United States Patent [19]

Hudgin et al.

[11] 4,260,548

[45] Apr. 7, 1981

[54] PROCESS FOR PREPARING POLYETHYLENE WAXES

[75] Inventors: Donald E. Hudgin, Princeton Junction; Thomas Zawadzki, Princeton, both of N.J.

[73] Assignee: Princeton Polymer Laboratories, N.J.

[21] Appl. No.: 45,331

[22] Filed: Jun. 4, 1979

[51] Int. Cl.³ .................. C07C 2/02; C07C 57/04; C07C 69/12; C07C 69/60
[52] U.S. Cl. .................. 260/346.74; 585/9; 585/527; 585/520; 560/190; 560/261; 562/598
[58] Field of Search .................. 585/520, 527, 9; 260/346.74

[56] References Cited

U.S. PATENT DOCUMENTS

| | | | |
|---|---|---|---|
| 2,706,719 | 4/1955 | Newberg et al. | 260/28.5 |
| 3,835,107 | 9/1974 | Stark et al. | 585/520 |
| 3,997,624 | 12/1976 | Hudgin | 585/520 |
| 4,060,569 | 11/1977 | Woods et al. | 585/520 |
| 4,124,753 | 11/1978 | Dench et al. | 585/520 |

*Primary Examiner*—Curtis R. Davis
*Attorney, Agent, or Firm*—Cushman, Darby & Cushman

[57] ABSTRACT

Low molecular weight ethylene homo and copolymer waxes are prepared by using a combination of (1) incremental addition of free radical catalyst (2) at high temperatures up to 150° C. and (3) high pressures up to 3000 psi. Preferably molten aliphatic waxes are used as the solvent.

31 Claims, No Drawings

PROCESS FOR PREPARING POLYETHYLENE WAXES

BACKGROUND OF THE INVENTION

In Hudgin U.S. Pat. No. 3,997,624, it was disclosed that high melting PE waxes can be made using an aliphatic hydrocarbon solvent, such as hexane. Although the process described in U.S. Pat. No. 3,997,624 produces a high quality wax, the method as described has a major drawback, namely that relatively large amounts of catalyst were required. Another drawback is that there must be used a volatile organic solvent.

It has also been previously proposed to polymerize ethylene in the presence of a molten petroleum wax, e.g. a crystalline or paraffin wax, Newberg U.S. Pat. No. 2,706,719.

SUMMARY OF THE INVENTION

It has now been found that an increased rate of polymerization and greatly improved yields of polyethylene waxes can be obtained by using a combination of (1) incremental addition of catalyst, (2) higher temperatures and (3) higher pressures. Pressures of 1500 to 3000 psi, preferably 2000 to 3000 psi, and temperatures of 120° to 150° C., preferably 130° to 150° C., can be used together with incremental addition of catalyst. This allows for more efficient use of equipment and thus results in a lower cost of operation.

Not all of the ethylene reacts initially and, consequently, fresh generation of catalyst is needed for maximum consumption of the ethylene to form polyethylene wax. The catalyst can be introduced 2, 3, 4, 5, 10, 50, 100 or more times. Ideally, the ethylene polymerization is carried out continuously and the catalyst is added at several points along the continuous line of flow of the polymerizing ethylene. Here again the catalyst can be added 2, 3, 4, 5, 10, 50, 100 or more times and, in fact, can be added an infinite number of times, i.e. continuously along the line of flow of the polymerization.

While there can be used low molecular weight solvents, e.g. hydrocarbons, carboxylic acid esters, ethers or ketones such as hydrocarbon solvents, e.g. alkanes having 5 to 10 carbon atoms such as pentane, hexane, octane and decane, aromatic hydrocarbons such as benzene and toluene, cycloalkanes, e.g. cyclohexane, ethers (including cyclic ethers) dipropyl ether, dibutyl ether, propylene oxide, dioxolane, dioxane and tetrahydrofuran, ketones, e.g. acetone or methyl ethyl ketone and alkyl esters of alkanoic acids such as methyl acetate, ethyl acetate, butyl acetate, methyl propionate, ethyl butyrate and amyl acetate, e.g. in an amount of 2 to 100 times the weight of the product as taught in Hudgin U.S. Pat. No. 3,997,624, it has been found preferable to use a molten aliphatic or Fischer-Tropsch wax. The temperature can be from the melting point of the wax up to 150° C., but desirably is at least 120° C., preferably at least 130° C.

When a molten high melting polyethylene wax (M.Pt.105°-120° C.) is used as a solvent, more of the same wax is produced by the ethylene polymerization, the high melting wax acting as its own solvent. Using such a wax as a solvent eliminates the need for a volatile solvent. This has a number of advantages, such as no toxicity and pollution problems, safer working conditions due to decrease in toxic atmosphere, lower fire hazard and elimination of solvent storage and recovery systems. All this translates into substantial cost savings.

A number of free radical initiators can be used. As one goes to higher temperature (100°-150° C.), those having ten hour half life temperatures of up to 150° C. are effective. However, as is shown by examples below, a free radical catalyst having a relatively low ten hour half life temperature (40°-59° C.) can also be used effectively by incremental addition to the reactor containing the molten wax and ethylene at pressures from 1500 to 3000 psi.

The term ten-hour half life means the temperature at which the free radical catalyst will have lost half of its initiating power in ten hours.

Any free radical catalyst can be used. For example, there can be used tertiary butyl peroxypivalate (TBPP) (sold by the Lucidol Division of Pennwalt Corp. as Lupersol 11), dicyclohexyl peroxy-dicarbonate (DCPC) sold by the Lucidol Division of Pennwalt Corp. as Luperox 229, 2,4-dichlorobenzoyl peroxide, t-butyl peroxyneodecanoate, t-butyl-peroxyneopentanoate, t-butyl peroxyncodecanoate, 2,5-dimethylhexane-2,5-diperoxyneopentanoate, 2,5-dimethylhexane-2,5-diperoxyneooctanoate, 2,5-dimethylhexane-2,5-diperoxyncodecanoate, 2,5-dimethylhexyne-3-2,5-diperoxyneopentanoate, 2,5-dimethylhexyne-3-2,5-diperoxyneooctanoate, 2-t-butylazo-2-hydroperoxy-4-methyl pentane, 2,5-dimethylhexyne-3-2,5-diperoxyncodecanoate 10 hour half life 38° C., 2,7-dimethyloctane-2,7-diperoxyneopentanoate, 2,7-dimethyloctane-2,7-diperoxyneooctanoate, accetyl sec.-heptyl sulfonyl peroxide, 2,7-dimethyloctane-2,7-diperoxyneodecanoate, diisobutyryl peroxide, diisononanoyl peroxide, di-sec.-butyl peroxydicarbonate, diisopropyl peroxydicarbonate, acetyl cyclohexanesulfonyl peroxide, 2-t,butylazo-2-cyano-4-methoxy-4-methylpentane, di-tert-butylperoxide, benzoylperoxide, lauroylperoxide, acetylperoxide, p.p'-dimethylbenzoylperoxide, p.p'-dimethoxybenzoylperoxide, p.p'-di-tert-butylbenzoylperoxide, and hydroperoxide compounds such as tert-butylhydroperoxide and cumene hydroperoxide, peracid compounds such as acetic peracid and benzoic peracid, azo compounds such as azo-bis-butyronitrile and diazoaminobenzene, and nitroso compounds such as N-nitroso-p-bromoacetanilide and N.N'-dinitroso-4,4'-dibromosuccinodianilide, t-butyl perbenzoate, diacetyl peroxide, furoyl peroxide and furoperacid. Further examples of free radical catalysts useful in the process of the present invention are tertiary butyl peroxy pivalate (TBPP) (sold by the Lucidol Division of Pennwalt Corp. as Lupersol II), 10 hour half life 57° C.; benzoyl peroxide, 10 hour half life 73° C.; di-t-butyl peroxide, 10 hour half life 115° C.; 2,5-dimethyl-2,5-bis (t-butyl peroxy) hexane, 10 hour half life 119° C.; and others listed in the Encyclopedia of Polymer Science and Technology, Volume 9, pp. 818–827. Certain azo compounds having 10 hour half life temperatures up to 150° C. work well. Examples are 2,2¹-azobisisobutyronitrile, 10 hour half life 67° C.; 2,2¹-azobis valeronitrile 10 hour half life 72° C.; 4-t-butyl azo-4 cyanovaleric acid, 10 hour half life 76° C.; 2-t-butyl azo-2-cyanobutane, 10 hour half life 82° C. and others listed in the Encyclopedia of Polymer Science and Technology, Volume 2, pp. 282–288.

The amount of catalyst also is not critical and can be that conventionally employed in the art, e.g. 0.1 to 20 parts per 100 parts of polymer produced. Much less catalyst is required than with one shot addition of catalyst.

The amount of solvent is not critical. Usually enough solvent is employed to keep the mixture fluid during the reaction. For example, there can be used solvent in an amount of 2 to 100 times the weight of product, but this range can be varied.

When copolymers are prepared, the copolymerizing compound can be present in an amount to provide up to 50 mol % of the copolymer, but preferably the copolymerizing compound is present in an amount of not over 30 mol % of the copolymer. Below 2 mol % of copolymerizing compound in the copolymer, there usually is not significant modifying effect over ethylene homopolymers. Two or more copolymerizing monomers can be employed, but in such case the total amount of copolymerizing monomers should not provide over 50 mol % of the polymer, the balance being ethylene units.

Illustrative copolymerizable monomers include vinyl acetate, acrylic acid, methacrylic acid, maleic anhydride, copolymerizable alpha monoolefins, e.g. propylene, isobutylene, butylene, lower dialkyl maleates, e.g. dibutyl maleate.

When copolymers are prepared the copolymerizing compound can be present in an amount to provide up to 50 mol % of the copolymer but preferably the copolymerizing compound is present in an amount of not over 30 mol % of the copolymer. Below 2 mol % of copolymerizing compound in the copolymer there usually is not significant modifying effect over ethylene homopolymers. Two or more copolymerizing monomers can be employed but in such case the total amount of copolymerizing monomers should not provide over 50 mol % of the polymer, the balance being ethylene units.

The products of this invention have a wide variety of end uses. Among the important uses are as coatings for paper containers, waxed paper for packaging, candles, waterproofing textiles, hot melt coatings and adhesives, can linings, cosmetics, electrical insulation, wax emulsions, printing inks, textile finishes and as a plastics modifier.

Unless otherwise indicated, all parts and percentages are by weight.

The invention will be further understood by reference to the following examples which include preferred embodiments of the invention.

COMPARISON EXAMPLES OUTSIDE THE INVENTION

Example A (Non-incremental addition of catalyst at relatively low temperature and pressure)

A 1-liter stirred Parr reactor (Parr Instrument Co., Model 4521) was charged with 500 ml pure hexane and 1 gram tertiary butyl peroxypivalate (Lucidol's Lupersoll 11). The reactor was closed and purged with prepurified nitrogen for 30 minutes. The reactor was then pressured with ethylene to 600 psi. The stirrer was started and heating begun. The temperature was allowed to rise to 55°-60° C., where it was held for approximately 20 hours. The pressure during this time rose to a maximum of 820 psi.

The reactor was then cooled to room temperature, depressurized and opened. The contents of the reactor was a white gelatinous material, which was placed in a glass tray and the hexane allowed to evaporate, leaving the wax product nearly solvent-free. The wax was then melted in a pyrex beaker on a hot plate which removed the last traces of solvent. The polyethylene wax weighed 36 g., showed a melting point of 117° C., had a Shore D. hardness of 52 and a density of 9.948.

This Example A shows the results of adding the catalyst all at once, rather than incrementally, together with relatively low pressure and temperature.

Example B (Use of Molten Polyethylene Wax as a Solvent and Non-incremental Addition of Catalyst)

A 1-liter stirred Parr reactor (Parr Instrument Co., Model 4521) was charged with 450 g. polyethylene wax (as prepared according to Example 12, U.S. Pat. No. 3,997,624), m.pt. 113°-115° C. The wax was melted completely to a fluid liquid at 130° C. by applying heat to the reactor. The reactor was closed and contents purged with prepurified nitrogen.

One gram of catalyst, 2,5-dimethyl-2,5-Bis (t-butylperoxy) hexane, was injected into the reactor and the reactor pressured with ethylene to 2,000 psi. After 12 hours, the reactor was depressurized and the weight of the contents determined. The weight had increased 65 g., which represents the amount of polyethylene wax produced by the polymerization.

DESCRIPTION OF THE PREFERRED EMBODIMENTS

Example C (Incremental Addition of Catalyst at a Higher Temperature and Pressure than that used in Example A)

Example A was repeated except 1 gram of the catalyst, tert. butyl peroxypivalate, was added in increments over a period of 8 hours. The temperature was kept between 120°-150° C. and the pressure range was 1500 to 2500 psi. After 10 hours total reaction time, the reactor was cooled to room temperature, depressurized and opened. The contents of the reactor was worked up as described in Example A. The polyethylene wax weighed 102.8 g., showed a melting point of 118° C., had a Shore D. hardness of 52 and a density of 0.951.

Example D (Effect of Incremental Catalyst Addition Using Molten Polyethylene Wax as a Solvent)

Example B was repeated except the catalyst was injected into the small reactor in small (0.05 g.) proportions at 15 minute intervals during the polymerization. Also, the pressure of 2000 psi was maintained throughout the reaction by periodically repressuring with ethylene.

The temperature rose rapidly to 150° C. and remained close to 150° C. for 1 hour. The introduction of the catalyst and ethylene was then stopped and the reactor was allowed to cool to about 130° C., depressurized and the weight of the contents determined. The weight had increased 115.5 g. and the melting point was the same as the original polyethylene wax used as a solvent.

As with Example C, this example illustrates the effectiveness of incremental addition over that of non-incremental addition (Example B).

The following examples illustrate how this invention is effective in preparing copolymers.

In Examples E, F and G the amount of solvent was the same in Example B.

| | Solvent | Catalyst | Temp. Range | Pressure Range | Reaction Time | Comonomer Used | Yield of Product By Non-Incremental Addition | Yield of Product By Incremental Addition |
|---|---|---|---|---|---|---|---|---|
| E | Polyethylene Wax. M. Pt. 108–110° C. | Benzoyl Peroxide 0.5g. | 120–150° C. | 1500–2300 psi | 0.5 hr | Vinyl Acetate 10g. | 20.2g. | 78.3g.* |
| F | 50/50 Mixture Polyethylene Wax + N-Heptane | Benzoyl Peroxide 0.5g. | 120–150° C. | 1500–2300 psi | 0.5 hr. | Vinyl Acetate 10g. | 19.8g. | 75.4g.* |
| G | Polyethylene Wax. M. Pt. 108–110° C. | Benzoyl Peroxide 0.5g. | 120–150° C. | 1500–2500 psi | 0.5 hr. | Dibutyl Maleate 10g. | 18.9g. | 76.3g* |

*Catalyst injected every 5 mins. (25% solution in hexane) (Small incremental additions)

The examples with "Yield of Product" by "Non-Incremental Addition" are for comparison and are not part of the invention.

The process can consist essentially of or consist of the steps set forth and the materials can compose, consist essentially of or consist of those set forth.

What is claimed is:

1. A process of preparing an ethylene polymer wax consisting essentially of polymerizing a member of the group consisting of (1) ethylene and (2) a mixture of ethylene with a copolymerizable monomer, said copolymerizable monomer being present in an amount to provide not over 50 mol % of the polymer units, in an inert or chain transfer solvent in the presence of a free radical forming catalyst employing (A) incremental addition of the catalyst, (B) a temperature of 120° to 150° C. and (C) a pressure of 1500 to 3000 psi.

2. A process according to claim 1 wherein the temperature is at least 130° C. for at least part of the polymerization time.

3. A process according to claim 1 wherein the temperature is at least 130° C. for all of the polymerization time.

4. A process according to claim 1 wherein the temperature is at 150° C. for at least part of the polymerization time.

5. A process according to claim 1 wherein the pressure is at least 2000 psi for at least part of the polymerization time.

6. A process according to claim 5 wherein the temperature is at least 130° C. for at least part of the polymerization time.

7. A process according to claim 1 wherein the catalyst is added continuously.

8. A process according to claim 1 wherein the catalyst is added in at least 4 separate portions during the polymerization.

9. A process according to claim 8 wherein the catalyst is added in at least 6 separate portions during the polymerization.

10. A process according to claim 1 wherein the amount of solvent is at least 2 times the weight of product formed.

11. A process according to claim 1 wherein the solvent comprises an inert or chain transfer solvent, having a molecular weight not over 200.

12. A process according to claim 1 wherein the solvent is selected from the group consisting of hydrocarbons, ethers, carboxylic acid esters and ketones.

13. A process according to claim 12 wherein the solvent consists of said solvent having a molecular weight not over 200.

14. A process according to claim 1 wherein said solvent comprises an aliphatic hydrocarbon wax and the polymerization is carried out above the melting point of the wax.

15. A process according to claim 14 wherein the wax is a paraffin wax or a Fischer-Tropsch wax.

16. A process according to claim 14 wherein the wax is a polyethylene wax.

17. A process according to claim 14 wherein the temperature is at least 130° C. during at least part of the polymerization.

18. A process according to claim 14 wherein the solvent is a mixture of said aliphatic hydrocarbon wax and an inert or chain transfer solvent having a molecular weight not over 200 and selected from the group consisting of hydrocarbons, ethers, carboxylic acid esters and ketones.

19. A process according to claim 14 wherein the solvent consists of said aliphatic hydrocarbon wax.

20. A process according to claim 19 wherein the temperature is at least 130° C. during at least part of the polymerization.

21. A process according to claim 20 wherein the wax is a polyethylene wax.

22. A process according to claim 21 wherein the wax has a melting point of 105°–120° C.

23. A process according to claim 19 wherein the wax is a polyethylene wax.

24. A process according to claim 1 wherein said member is ethylene.

25. A process according to claim 1 wherein said member is a mixture of ethylene and copolymerizable monomer.

26. A process according to claim 25 wherein said copolymerizable monomer is selected from the group consisting of vinyl acetate, acrylic acid, methacrylic acid, maleic anhydride, a copolymerizable alpha monoolefin and a lower dialkyl maleate.

27. A process according to claim 1 wherein the pressure is 1500 to 2500 psi.

28. The process of claim 1 wherein the solvent consists of a hydrocarbon which is an aliphatic hydrocarbon wax, a cycloalkane having a molecular weight not over 200 or an alkane having a molecular weight of not over 200.

29. The process of claim 28 wherein the solvent is a mixture of (1) an aliphatic hydrocarbon wax and (2) a cycloalkane or alkane having a molecular weight not over 200.

30. The process of claim 28 wherein the solvent consists of an alkane having a molecular weight not over 200.

31. The process of claim 1 wherein the incremental addition of the catalyst is added along the line of flow of the polymerization to a mixture which contains both (a) (1) ethylene or (2) a mixture of ethylene and a copolymerizable monomer and (b) the polymer of (1) or the polymer of (2).

* * * * *